(12) United States Patent
Lewine

(10) Patent No.: US 6,230,202 B1
(45) Date of Patent: May 8, 2001

(54) METHOD FOR PERFORMING TRANSACTIONS ON THE WORLD-WIDE WEB COMPUTER NETWORK

(76) Inventor: Donald A Lewine, 40 Maclean Dr., Sudbury, MA (US) 01776

( * ) Notice: Subject to any disclaimer, the term of this patent is extended or adjusted under 35 U.S.C. 154(b) by 0 days.

(21) Appl. No.: 08/432,610

(22) Filed: May 1, 1995

(51) Int. Cl.[7] ........................................ G06F 15/16
(52) U.S. Cl. ..................... 709/229; 709/203; 709/219
(58) Field of Search ...................... 395/200.9, 401, 395/408; 709/229, 203, 219; 705/26–27, 43; 713/200; 380/217, 218

(56) References Cited

U.S. PATENT DOCUMENTS

| | | | |
|---|---|---|---|
| 4,992,940 | * | 2/1991 | Dworkin ............................ 364/401 |
| 5,220,501 | * | 6/1993 | Lawlor et al. ..................... 364/408 |
| 5,319,542 | * | 6/1994 | King, Jr. et al. .................. 364/401 |
| 5,347,632 | * | 9/1994 | Filepp et al. ................... 395/200.09 |
| 5,428,606 | * | 6/1995 | Moskowitz ........................ 370/60 |

OTHER PUBLICATIONS

"Relevant–Protocols" Webmaster@W3.org*
John December & Neil Randall; Sams Publishing; The World Wide Web Unleashed; Dec. 1, 1994; 1058pgs.
James E. Pitkow & Margaret M. Recker; Third International WWW Conference; Using the Web as a Survey Tool; Apr. 15, 1995; 12pgs.

* cited by examiner

*Primary Examiner*—John A. Follansbee
(74) *Attorney, Agent, or Firm*—Donald A. Lewine

(57) ABSTRACT

A method is disclosed for determining a user's identity and creating a virtual session using the HTTP protocol without modifying the protocol or changing its stateless nature.

12 Claims, 1 Drawing Sheet

METHOD FOR PERFORMING TRANSACTIONS ON THE WORLD-WIDE WEB COMPUTER NETWORK

CROSS REFERENCE TO RELATED APPLICATIONS

There are no related applications.

BACKGROUND—FIELD OF INVENTION

This invention relates to performing transactions over a computer network. More particularly, it relates to performing retail client/server transactions on the internet using the Hypertext Transfer Protocol (HTTP).

BACKGROUND—DESCRIPTION OF PRIOR ART

For fifty years, people have dreamed of the concept of a universal information database—data that would not only be accessible to people around the world, but information that would link easily to other pieces of information so that only the most important data would be found by a user. Only now has technology caught up with these dreams, making it possible to implement them on a global scale. This global system is called the World-Wide Web or WWW.

The WWW began in Mar. 1989, when Tim Berners-Lee of CERN (a collective of European high-energy physics researchers) proposed the project to be used as a means of transporting research and ideas effectively throughout the organization.

Months after CERN's original proposal, the National Center for Supercomputing Applications (NCSA) began a project to create an interface to the World-Wide Web. One of NCSA's missions is to aid the scientific research community by producing widely available, non-commercial software. The NCSA's Software Design Group began work on a versatile, multi-platform interface to the World-Wide Web and called it Mosaic.

The use of Mosaic during the second half of 1993 and 1994 has been growing rapidly. There are now millions of copies distributed on computers all over the world.

The Web works under the popular client-server model. A web server is a program running on a computer whose only purpose is to serve documents to other computers when asked to. A Web client is a program that interfaces with the user and requests documents from a server as the user asks for them. Here is an example of how the process works:

1. Running a Web client (also called a browser), the user selects a piece of hypertext connected to another text, say "Manual of Patent Examining Procedures."

2. The Web client connects to a computer specified by a net-work address somewhere on the Internet (say, www.uspto.gov) and asks that computer's Web server for the "Manual of Patent Examining Procedures."

3. The server responds by sending text and any other media within that text (pictures, sounds, or movies) to the user's screen. In a our example, the server might provide an index to the MPEP which contains links to other documents.

The language that Web clients and servers use to communicate with each other is called the HyperText Transmission Protocol (HTTP). All Web clients and servers must be able to speak HTTP in order to send and receive hypermedia documents. For this reason, Web servers and often called HTTP servers.

The phrase "World-Wide Webb" is often used to refer to the collective network of servers speaking HTTP as well as the global body of information available using the protocol.

The standard language the Web uses for creating and recognizing hypermedia documents is the HyperText Markup Language (HTML).

The descriptions of the Hypertext Transfer Protocol and Hypertext Markup Language are kept on the Web and are continuously being revised and updated. A printed copy of the protocol and language descriptions are included with this application as Appendix A and Appendix B. They provide background on the operation of the World-Wide Web, however, anyone of even modest skill in World-Wide Web programming would know to consult the on-line version for the most current information.

A good book on the World-Wide Web is "The World-Wide Web Unleashed" by John December. While "The World-Wide Web Unleashed" provides a good background for understanding the current invention, it was published after the invention was made and should not be considered prior art.

One of the major disadvantages of the HTTP protocol is that it is stateless. A request is sent from the client to the server and the server completes the entire request at once and sends a single reply message ending the transaction. It is not possible to carry on a dialog using the HTTP protocol because there is no history of previous transactions.

There have been attempts to build state information into HTTP transactions. James E. Pitkow and Margaret M. Recker describe using the hidden attribute of the TYPE field used in HTML forms. (See "Using the Web as a Survey Tool: Results for the Second WWW User Survey" to be published in the 1995 WWW Conference Report for details.) Pitkow and Recker's scheme is restricted to HTML forms and cannot be used for text web pages. Also, the forms must be computed on-the-fly imposing a great deal of overhead compared to documents which can merely be read from a file.

Another scheme encodes the user identification into the URL used to access the data. This scheme has several disadvantages. First, it defeats many caching schemes thus providing lower performance. Second, the user cannot save a particular location in his "hot-list" because there is session information in the URL.

Most people attempting to sell products using the World-Wide Web put up with the limitations of HTTP and require the user to enter her name, address, and credit card number for every item she wants to buy. Some people even require the customer to print the screen and FAX it to the store.

OBJECTS AND ADVANTAGES

One object of the current invention is to allow the user to create a profile identified by a username and password. The user enters his full name, address, and method of payment once when he creates his profile and he never has to enter it again.

Another object of the current invention is to allow the user to enter his username and password and the start of a session and not have to repeatedly supply his username and password.

Another object of the current invention is to allow the user to shop without using a profile and enter her name, address and method of payment for each transaction, just like the prior art. The shopper is allowed to create a profile but she is not forced to create one.

SUMMARY

Figure 1:
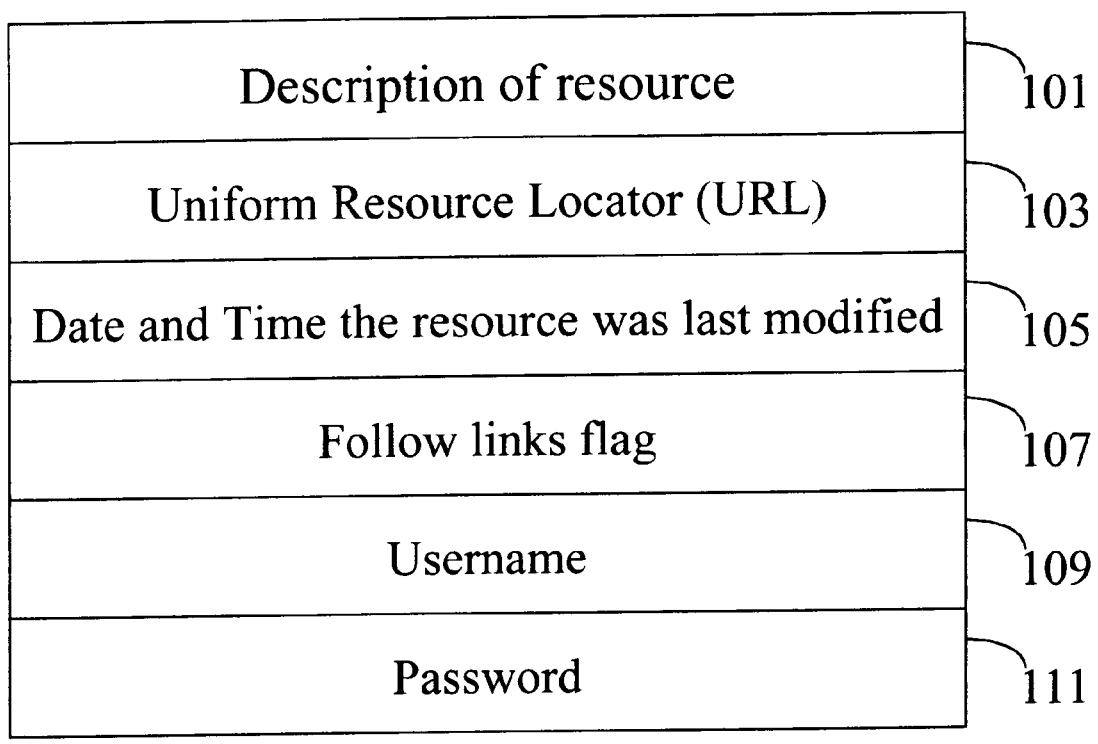
FIG. 1 A Web page with hyper-links.

The current invention extends to capabilities of the HTTP protocol to allow a user to identify himself and create a session, he can then conduct transactions during that session without identifying himself again. He can select items to be purchased and add them to his order. All of the parts of the order are linked together and the order may be processed after the end of the session.

The current invention takes advantage of the protection mechanism of the http protocol in a way never envisioned by the authors of the protection mechanism.

The protection mechanism is designed so that selected web pages may be accessed only by people who know the password. In that way, a web server can have public pages and private pages.

The protection mechanism also allows an entire UNIX directory tree to be protected. For example, /known may be a protected directory and all of the files in the directory (including other directories) are all protected. If the user had to enter his username and password every time he wanted to access a protected page, there would be a large burden on the user. Most browsers, therefore, remember the username and password for a given directory. So, if /known was accessible using the username of dlewine and the password of bigbooks, the browser would remember the username & password for /known and each time the user attempts to access a file (web page) in the /known directory, the browser sends the username and password to the web server.

The present invention uses the protection mechanism to trick the browser into sending the username and password on every access. Thus, without making any modifications to the millions of browsers in the world, the web server using this invention is able to know exactly who is accessing each web page.

Once the server knows the username and password it is able to lookup the users real name, shipping address, credit card numbers and other information.

PREFERRED EMBODIMENT—DESCRIPTION

In the preferred embodiment, there are two parallel web hiearcheries. One is called /store and the other is called /known.

The user first accesses the store by using the URL. In the welcome.html file is the following hyperlink:

```
<H3>Do you have an intertain.com profile?
<A HREF="/known/welcome.html">YES</A>
or
<A HREF="/store/no.html">NO</H3></A>
```

If the use clicks NO he gets the following html code:

```
<HTML>
<HEAD>
<TITLE>Access the internet bookstore</TITLE>
</HEAD>
<BODY>
<IMG SRC="/store/icons/BlueMarbleLine.gif" ALT=" ">
<H1>Welcome to intertain.com</H1>
<IMG SRC="/store/icons/BlueMarbleLine.gif" ALT=" ">
<P><IMG SRC="/store/icons/Warning.gif" ALT=" ">
<B>Before you choose a book</B>, we need to
```

-continued

```
know where to send it and how you'd like to
pay for it. Feel free to look around without
setting up a profile.</P>
<P>
<A HREF="/store/search.html"><IMG
SRC="/store/icons/books.gif" ALT=" ">
Search for books by author and title
without using a profile</A>.
Profiles are our way of avoiding asking you to identify
yourself each time you chose to buy a book. If you'd
prefer not to fill out a profile, you are welcome to
buy as many books as you'd like, identifying
yourself each time.</P>
<P>
<A HREF="/store/new-acct.html"><IMG SRC="/store/icons/face.gif"
ALT=" ">
Create my intertain.com profile</A>
so that I only need to enter the information once.</P>
</BODY>
</HTML>
```

This code produces the image shown in FIG. 1. There are several little pictures (icons) 101, 102, 103 which make the screen more interesting. There are two hyperlinks. The first link 110 allows the user to operate without a profile. It links to the /store directory which is not protected. The second link 120 lets the user create a profile.

If the user clicks on YES she is linked over the /known/welcome.html file. That page is protected and the server sends back a code 401 ACCESS DENIED message. The user is then asked for a username/password pair. If she supplies the correct pair, access is allowed and her browser remembers her username and password for future access to the server.

It is important that once the user is "known" all hyperlinks refer the user back to the /known directory tree. For static web pages, it is simple to maintain a parallel set of files: one in the /store directory tree and one in the /known directory tree. Once the user identifies himself and links over to the /known tree, he is never linked back to the /store tree. Much HTML code is generated on the fly. This code must determine if the user is logged in and setup the correct hyper links.

A example of C code to perform this function is given below:

```
void end_html (void)
{
    char *where = "store";   /* Hyperlink to this directory */
    int  login = 0;          /* 1 if "known" - 0 if not */
    char *cl;                /* Character pointer */
    char username[256];
    cl = getenv("AUTH_TYPE");
    if (cl)
        login = ! (stromp (cl, "Basic"));
    if (login)
    {
        cl = getenv("REMOTE_USER");
        if (cl)
            strcpy (username, cl);
        else
            login = 0;
    }
    if (login) where = "known";
    printf("<P></P>\n"):
    printf("<P><A HREF=\"/%s/search.html\">\n", where);
    printf("Search again</A>\n");
    printf("<A HREF=\"/%s/browse/browse.html\">\n", where);
```

-continued

```
    printf("Browse again.</A>\n");
    printf("<A HREF=\"/%s/welcome.html\">Return</A>\n", where);
    printf("to <B>intertain.com</B>
    home page.</P></BODY><HTML>\n");
}
```

Here is what the code does:

1. Assume that the user is not known and set the variable *where* to "store" and *login* to 0 (false).

2. Lookup the environment variable AUTH_TYPE to determine if user authentication is in effect. The variable *cl* will be set to NULL if there is no AUTH_TYPE environment variable.

3. If there is an AUTH_TYPE environment variable, and it has the value "Basic" then set the variable *login* to 1 (true).

4. If the user is known, lookup the environment variable REMOTE_USER and save the value of that environment variable in the variable *username*. This step is not strictly required for the invention to operate, however, in general the name of the user will be required at some point and it is easy to get it here.

5. If the user is known (the variable *login* is true), set the variable *where* to the value "known".

6. Generate hyperlinks (URLs) that point either to /store/search.html or /known/search.html depending on the value of the variable *where*.

7. In an identical way generate, hyperlinks to /store/browse.html (or /known/browse.html) and to /store/welcome.html (or /known/welcome.html).

CONCLUSIONS, RAMIFICATIONS, AND SCOPE

The description above describes the operation of the bookstore operating at however, the modification to use this invention at another bookstore or at a network store selling things other than books are obvious to one of even modest skill.

The description above describes the best mode contemplated by the inventor, however, it is obvious that the above invention can easily be adapted to other uses, such as an on-line survey, marketing questionnaire or anyplace where is useful to overcome the stateless limitation of the http protocol.

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their legal equivalents, rather than by the examples given.

What is claimed is:

1. A method for ordering goods or services from a store on the world wide web where said store is implemented using a server computer having:

(a) the capability of being accessed by a plurality of users each said user having a browser;

(b) a plurality of user profile records, one or more unprotected pages, and one or more protected pages;

(c) a unique first username associated with each said profile record;

(d) a first password associated with each said profile record; and (e) the capability of at least one of said users accessing at least one of said unprotected pages without supplying a username or password;

said method of associating one of said users with one of said profile records comprising:

(i) allowing said user to attempt to access one of said protected pages using the http GET method;

(ii) returning an ACCESS DENIED code in response to said attempt;

(iii) said ACCESS DENIED code causing said user's browser to ask said user for a second username and a second password and to transmit said second username and said second password to said server computer in the http authorization header; and (iv) locating one of said user profile records such that said second username and said second password match the first username and first password associated with said stored user profile.

2. The method according to claim 1, where said ACCESS DENIED code has the value 401.

3. The method according to claim 1, where each said user profile record comprises at least a method of payment.

4. The method according to claim 1, where said user profile records further comprise a customer's name.

5. The method according to claim 1, where said user profile records further comprise a shipping address.

6. The method according to claim 1, where for every said protected pages there is a corresponding unprotected page.

7. The method according to claim 1, where when one of said plurality of users wants to buy an item described on one of said unprotected pages, said user is presented with a form for entering said users name and address.

8. In a computer having:

(a) the capability of being accessed using the http protocol by a first user and a second user each said user having a browser;

(b) a plurality of user profile records with a unique first username associated with each said profile record;

(c) a first password associated with each said profile record;

(d) one or more unprotected pages; and (e) one or more protected pages;

a method for associating said first user with one of said plurality of profile records comprising:

(i) allowing said first user to attempt to access one of said protected pages using the http GET method;

(ii) returning an ACCESS DENIED code in response to said attempt;

(iii) said ACCESS DENIED code causing said user's browser to ask said user for a second username and a second password and to transmit said second username and said second password to said computer in the http authorization header; and (iv) locating one of said user profile records such that said second username and said second password match said first username and first password associated with said user profile record.

9. In the computer according to claim 8, a method for allowing one of said second plurality of users to make purchases without using a username and password comprising:

(i) allowing said second user to view said unprotected pages;

(ii) presenting said user with a form for entering said user's name and address.

10. The computer according to claim 9 where there is no user profile record corresponding to said one of said second plurality of users.

11. The computer according to claim 9, where said form also includes a method of payment.

12. The computer according to claim 8, where said profile record contains the user's name and address.

* * * * *